US011986826B2

(12) United States Patent
Wang et al.

(10) Patent No.: US 11,986,826 B2
(45) Date of Patent: May 21, 2024

(54) SAMPLE TRANSPORT APPARATUS FOR MASS SPECTROMETRY

(71) Applicant: Shanghai Polaris Biology Co., Ltd., Shanghai (CN)

(72) Inventors: Yuchong Wang, Shanghai (CN); Shuangwu Sun, Shanghai (CN); Ran Wei, Shanghai (CN); Yupeng Cheng, Shanghai (CN)

(73) Assignee: SHANGHAI POLARIS BIOLOGY CO., LTD., Shanghai (CN)

(*) Notice: Subject to any disclaimer, the term of this patent is extended or adjusted under 35 U.S.C. 154(b) by 379 days.

(21) Appl. No.: 17/523,638

(22) Filed: Nov. 10, 2021

(65) Prior Publication Data

US 2022/0134343 A1 May 5, 2022

Related U.S. Application Data

(63) Continuation of application No. PCT/CN2020/085063, filed on Apr. 16, 2020.

(30) Foreign Application Priority Data

May 15, 2019 (WO) ................ PCT/CN2019/087075

(51) Int. Cl.

*B01L 3/00* (2006.01)
*H01J 49/04* (2006.01)
*H01J 49/10* (2006.01)

(52) U.S. Cl.

CPC .... *B01L 3/502784* (2013.01); *H01J 49/0445* (2013.01); *H01J 49/105* (2013.01);
(Continued)

(58) Field of Classification Search

CPC ......... B01L 3/502784; B01L 2200/027; B01L 2200/0626; B01L 2300/0838;
(Continued)

(56) References Cited

U.S. PATENT DOCUMENTS 8,963,076 B2 2/2015 Jong et al.
9,673,032 B1 * 6/2017 Schleifer ............... H01J 49/045
(Continued)

FOREIGN PATENT DOCUMENTS

CN 103285947 A 9/2013
CN 105190829 A 12/2015
(Continued)

OTHER PUBLICATIONS

International search report with written opinion dated Jul. 22, 2020 for PCT/CN2020/085063.
(Continued)

*Primary Examiner* — Nicole M Ippolito
(74) *Attorney, Agent, or Firm* — Wilson Sonsini Goodrich & Rosati

(57) ABSTRACT

Systems and methods are provided for high-efficiency transport of single particles for inductively coupled plasma mass spectrometry. Single particles may be delivered to the mass spectrometer for quantification of trace elements. The systems may include droplet generation, conveyance module, capillary tubing, and/or an integrated inductively coupled plasma (ICP) torch, which may allow for the sequential transportation of single particles.

20 Claims, 10 Drawing Sheets

(52) U.S. Cl.
CPC . *B01L 2200/027* (2013.01); *B01L 2200/0626* (2013.01); *B01L 2200/0647* (2013.01); *B01L 2300/0838* (2013.01); *B01L 2400/049* (2013.01); *B01L 2400/0644* (2013.01)

(58) Field of Classification Search
CPC ........ B01L 2400/049; B01L 2400/0644; H01J 49/0445; H01J 49/105
See application file for complete search history.

(56) References Cited

U.S. PATENT DOCUMENTS

| | | | | |
|---|---|---|---|---|
| 2006/0024199 | A1 | 2/2006 | Tao et al. | |
| 2011/0024615 | A1 | 2/2011 | Tanner et al. | |
| 2012/0018306 | A1 | 1/2012 | Srinivasan et al. | |
| 2012/0028311 | A1 | 2/2012 | Colston, Jr. et al. | |
| 2012/0085900 | A1 | 4/2012 | Verbeck, IV et al. | |
| 2012/0153143 | A1 | 6/2012 | Kennedy et al. | |
| 2014/0250980 | A1 | 9/2014 | Hentz et al. | |
| 2014/0315237 | A1 | 10/2014 | Masujima et al. | |
| 2017/0178884 | A1* | 6/2017 | Murtazin ................ | G01J 3/443 |

FOREIGN PATENT DOCUMENTS

| | | | |
|---|---|---|---|
| CN | 107045015 | A | 8/2017 |
| WO | WO-2008080224 | A1 | 7/2008 |
| WO | WO-2016109603 | A1 | 7/2016 |
| WO | WO-2020228475 | A1 | 11/2020 |

OTHER PUBLICATIONS

Shigeta, et al. Application of a micro-droplet generator for an ICP-sector field mass spectrometer-optimization and analytical characterization. Journal of Analytical Atomic Spectrometry 28.5 (2013): 646-656.

Thomas, R. A beginner's guide to ICP-MS. Part II Spectroscopy 16.5 (2001): 56-61.

Thomas, R. A beginner's guide to ICP-MS. Part III Spectroscopy 16.6 (2001): 26-31.

Thomas, R. A beginner's guide to ICP-MS. Part I Spectroscopy 16.4 (2001): 38-43.

Verboket, et al. A new microfluidics-based droplet dispenser for ICPMS. Analytical Chemistry 86.12 (May 7, 2014): 6012-6018.

Wang, et al. A facile droplet-chip-time-resolved ICPMS online system for determination of zinc in single cell. Analytical Chemistry 89(9). (Apr. 2007) 26 pages.

* cited by examiner

SAMPLE TRANSPORT APPARATUS FOR MASS SPECTROMETRY

CROSS-REFERENCE

This application is a continuation application of International Application No. PCT/CN2020/085063 filed on Apr. 16, 2020, which claims priority from PCT Application No. PCT/CN2019/087075 which was filed on May 15, 2019, the content of which is hereby incorporated by reference in its entirety.

BACKGROUND OF THE INVENTION

Traditionally, a sample introduction apparatus may use a nebulizer and a spray chamber. A sample solution can be transported to a nebulizer for nebulization. Most aerosol sample sprays, especially high velocity droplets with large volume, may hit an inner wall of a spray chamber, leading to a significant loss of sample. This results in a low transport efficiency of single particles or cells, which is not sufficient for many applications, especially analyzing limited clinical samples.

Furthermore, the random process of nebulization in traditional systems can lead to the formation of doublets, triplets, or even multiplets of particles, which makes downstream data analysis even more complicated and challenging.

SUMMARY OF THE INVENTION

A need exists for improved systems and methods for sample transport. A need exists for systems and methods that allow for single particles, such as single cells, to be transported in an efficient manner. A further need exists for systems and methods that allow for transport of the single particles suitable for downstream mass spectrometry-based analysis.

Aspects of the invention are directed to a system for transporting individual particles for mass spectrometry, said system comprising: a module configured to form individual sample droplets by merging distributed particle suspension with a carrier fluid to encase individual particles in the carrier fluid; and a torch that receives the individual sample droplets and generates a spray that is ionized and to be received by a downstream mass analyzer.

Additional aspects of the invention are directed to a method for transporting individual particles for mass spectrometry, said method comprising: forming individual sample droplets by merging distributed particle suspension with a carrier fluid to encase individual particles in the carrier fluid; receiving the individual sample droplets at a torch, and generating a spray that is ionized; and transporting ionized sample to a downstream mass analyzer.

A conveyance module for individual sample droplets may be provided in accordance with further aspects of the invention. The module may comprise: an inlet path configured to receive the individual sample droplets, wherein an individual sample droplet comprises an individual sample particle encased in a carrier fluid droplet; and a vertical syringe configured to receive the individual sample droplets from the inlet path and inject the droplets to a torch that creates a spray for downstream analyzing of the individual sample particle for mass spectrometry.

Moreover, aspects of the invention may include a method for transporting individual sample droplets, said method comprising: receiving, at an inlet path, the individual sample droplets, wherein an individual sample droplet comprises an individual sample particle encased in a carrier fluid droplet; and receiving, at a vertical syringe, the individual sample droplets from the inlet path and injecting the droplets to a torch that creates a spray for downstream analyzing of the individual sample particle for mass spectrometry.

Aspects of the invention may also be directed to a torch that aids in transport of individual sample droplets for mass spectrometry, said torch comprising: an inlet that receives the individual sample droplets, wherein an individual sample droplet comprises an individual sample particle encased in a carrier fluid droplet; and a sample outlet that issues a micro-spray of the individual sample droplets, that is further atomized and ionized in plasma, for downstream analyzing of the ionized sample for mass spectrometry.

In accordance with additional aspects of the invention, a method for handling individual sample droplets for mass spectrometry may be provided, said method comprising: receiving the individual sample droplets, wherein an individual sample droplet comprises an individual sample particle encased in a carrier fluid droplet; issuing a micro-spray of the individual sample droplets; atomizing and ionizing in plasma the micro-spray of the individual sample droplets to form an ionized sample; and transporting the ionized sample for downstream analyzing of the ionized sample for mass spectrometry.

Furthermore, aspects of the invention may be directed to a torch that aids in transport of individual sample droplets for mass spectrometry, said torch comprising: an inner tube comprising a carrier gas inlet and a sample outlet that issues a micro-spray of the individual sample droplets; a middle tube comprising an auxiliary gas inlet; and an outer tube comprising a plasma gas inlet, wherein the inner tube, the middle tube, and the outer tube is arranged in a concentric arrangement.

Aspects of the invention may be directed to a method for handling individual sample droplets for mass spectrometry, said method comprising: providing an inner tube comprising a carrier gas inlet and a sample outlet that issues a micro-spray of the individual sample droplets; providing, concentrically around the inner tube, a middle tube comprising an auxiliary gas inlet; and providing, concentrically around the middle tube, an outer tube comprising a plasma gas inlet.

A torch that aids in transport of individual sample droplets for mass spectrometry may be provided in accordance with additional aspects of the invention, said torch comprising: a capillary tube configured to enable transport of the individual sample droplets, wherein the individual sample droplet comprises an individual sample particle encased in a carrier fluid droplet; and a plurality of tubes arranged concentrically around the capillary tube, wherein the plurality of tubes allow for the flow of at least a carrier gas and a plasma gas, and permit the individual sample droplets to issue from at least one of the tubes as a micro-spray.

Moreover, aspects of the invention may be directed to a method for handling individual sample droplets for mass spectrometry, said method comprising: transporting the individual sample droplets via a capillary tube, wherein the individual sample droplet comprises an individual sample particle encased in a carrier fluid droplet; allowing for the flow of at least a carrier gas and a plasma gas via a plurality of tubes arranged concentrically around the capillary tube; and issuing the individual sample droplets from at least one of the tubes as a micro-spray.

A capillary rack configured to fit within a torch body to aid in transport of individual sample droplets for mass spectrometry may be provided in accordance with aspects of the invention, said capillary rack comprising: a hole configured to accept a capillary tube configured to enable transport of the individual sample droplets, wherein the individual sample droplet comprises an individual sample particle encased in a carrier fluid droplet; and one or more support arms configured to stabilize the capillary tube within the torch body and form openings that allow for passage of carrier gas between the one or more support arms.

Aspects of the invention may be further directed to a method of aiding in transport of individual sample droplets for mass spectrometry, said method comprising: providing a hole configured to accept a capillary tube configured to enable transport of the individual sample droplets, wherein the individual sample droplet comprises an individual sample particle encased in a carrier fluid droplet; and supporting the hole via one or more support arms configured to stabilize the capillary tube within the torch body and form openings that allow for passage of carrier gas between the one or more support arms.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

The invention provides systems and methods for sample transport of single particles. Various aspects of the invention described herein may be applied to any of the particular applications set forth below. The invention may be applied as a part of a mass spectrometry system. It shall be understood that different aspects of the invention can be appreciated individually, collectively or in combination with each other.

The invention may advantageously provide sequential transport of single particles. A particle may be suspended within a droplet. The droplet may be formed from a carrier fluid, such as oil. The systems and methods provided herein may provide control of sample delivered to the mass spectrometer. The systems and methods provided herein may provide relatively uniform droplets that are conveyed in a controlled manner.

The systems and methods provided herein may allow for an inductively coupled plasma (ICP) torch design. The torch design may reduce droplet accumulation at an outlet, which may reduce the destabilization of plasma. The torch design may allow for the sample to be delivered as a micro-spray that is atomized and ionized in plasma. The torch design may advantageously allow for a small spray angle for improved ion transportation to a mass analyzer. The torch design may stabilize a capillary that transports the sample particles, which may improve resolution and sensitivity of the mass analyzer. A capillary rack may be used to stabilize the capillary within the ICP torch. The capillary rack may be designed to advantageously allow carrier gas to pass through while holding the capillary in a stable, fixed position.

The systems and methods provided herein may allow for improved efficiency of the sample transport apparatus. A droplet generator, syringe pump, capillary, and ICP torch may be arranged in a manner that reduces loss and enhances delivery efficiency. The various components may be closely connected to increase the efficiency of sample delivery, atomization, and ionization. In turn, this may enhance specificity, sensitivity, and detection limits of the downstream mass analyzer. This may be particularly advantageous for small sample volumes. In some instances, a sample transport efficiency of at least 80%, 85%, 90%, 95%, 97%, 99%, 99.5% or 99.9% may be achieved.

Figure 1:
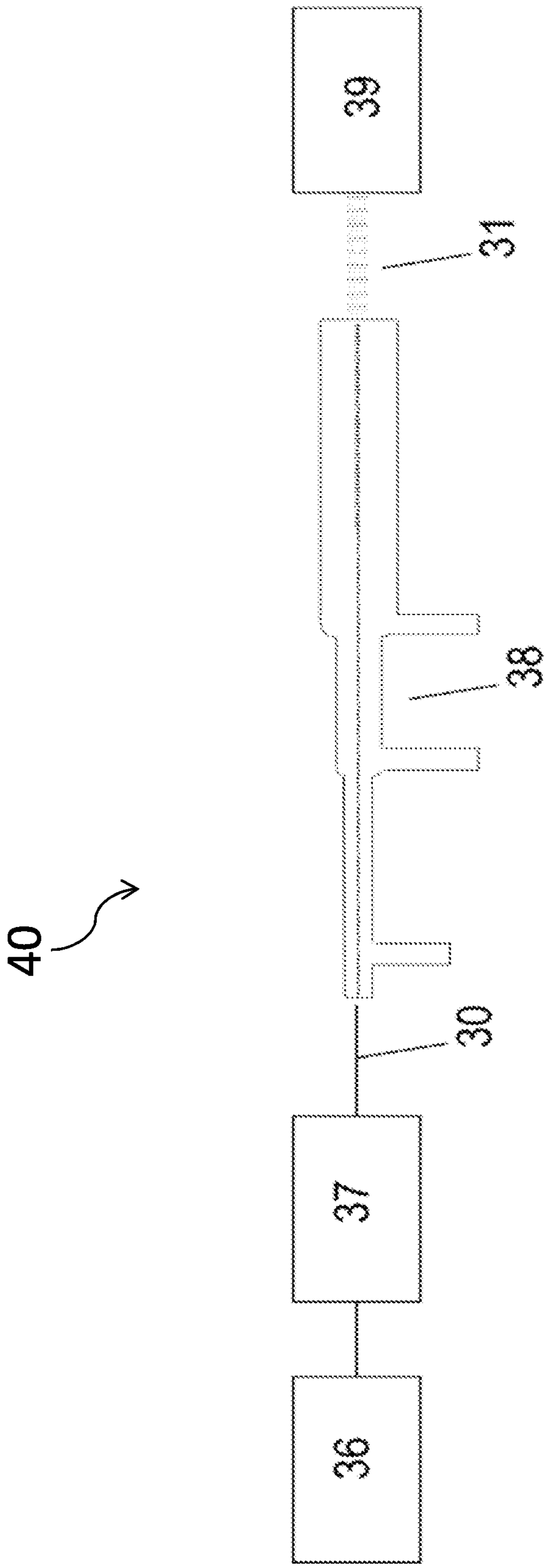
FIG. 1 shows a schematic of a sample transport apparatus for mass spectrometry, in accordance with embodiments of the invention.

FIG. 1 shows a schematic of a sample transport system 40 for mass spectrometry, in accordance with embodiments of the invention. The sample transport system may include a droplet generator 36, a conveyance module 37, tubing 30, and/or an integrated inductively coupled plasma (ICP) torch 38. The ICP torch may generate a spray 31 which may be transported to a downstream mass analyzer 39.

The droplet generator 36 may be used to generate and deliver single particle droplets suitable for ICP-MS sampling. Single particles may include single cells, beads, or aerosols. Single particles may be formed of any type of material to be analyzed. In some instances, the single particles may be formed from a biological material. The single particle may be formed from an organic material or inorganic material. The particles may or may not be tagged with a label. The particles may be tagged with a metal isotope or any other type of label or marker. The particles may have any size. For instance, a particle may have a diameter less than or equal to 1 nm, 3 nm, 5 nm, 10 nm, 50 nm, 100 nm, 500 nm, 1 μm, 3 μm, 5 μm, 10 μm, 20 μm, 30 μm, 50 μm, 75 μm, or 100 μm. Single particles may be encapsulated in a carrier. For instance, a single cell may be encapsulated in a carrier. The carrier may form a droplet that may partially or completely surround the particle. The particle may be suspended within the carrier droplet.

The carrier may be a carrier fluid, such as oil. An oil may be a fluorinated oil. For instance, the oil may be HFE-7500 or FC-40. In some embodiments, the oil may contain at least 1.8% w/w poly(ethylene glycol)-perfluoropolyether triblock surfactant. Optionally, the oil may contain at least 1.8% w/w poly(methyl glycerol)-perfluoropolyether triblock surfactant. The oil may contain at least 1.8% w/w polyglycerol-perfluoropolyether triblock surfactant. Optionally, the oil may contain at least 1.5% w/w, 1.6% w/w, 1.7% w/w, 1.9% w/w, 2% w/w, 2.2% w/w or 2/5% w/w of any of the example oils provided above. The oil may have a boiling point from 100° C. to 160° C. The oil may have a liquid density from 1000 $kg/m^3$ to 2000 $kg/m^3$. The oil may have a kinematic viscosity from 0.5 cSt to 2.0 cSt. The droplet generator may yield individual sample droplets which may include particles within the carrier fluid droplets.

The droplet generator may optionally control or limit the volume of the sample droplets. For instance, the droplet generator may have an inner diameter within a desired range to reduce or limit the volume of the sample droplets, which may make it easier to vaporize or atomize the sample droplets later in the process. This may allow for improved ionization efficiency in the plasma.

The droplet generator may be operatively coupled to a conveyance module 37. The conveyance module may receive sample droplets from the droplet generator. The conveyance module may convey the sample droplets from the droplet generator to the ICP torch. The conveyance module may provide impetus that may cause movement of the sample droplets to the ICP torch. The conveyance module may allow for droplets to be transported individually without merging. The conveyance module may allow for droplets to be transported one-by-one in a sequential fashion. The conveyance module may control the rate at which droplets are transported.

The conveyance module may receive the sample droplets directly from the droplet generator. In some instances, no intermediary devices are provided. Alternatively, intermediary devices may be utilized to convey the sample droplets from the droplet generator to the conveyance module. The droplet generator may be physically connected to the conveyance module while in use. The conveyance module may pull the sample toward the conveyance module. Alternatively, a mechanism in the droplet generator may push the sample toward the conveyance module. The droplet generator and the conveyance module may be formed of an integral piece, or may be connected to one another with aid of a connector.

The conveyance module may or may not optionally control or limit the volume of the sample droplets. For instance, the conveyance module may have an inner diameter within a desired range to reduce or limit the volume of the sample droplets, which may make it easier to vaporize or atomize the sample droplets later in the process.

Sample droplets may be conveyed via the conveyance module to the ICP torch 38. In some embodiments, the droplets may be conveyed via tubing 30 to the ICP torch. The tubing may be a capillary tube, such as a fused quartz capillary tube. The tube may allow individual sample droplets to flow therein. The tubing may be positioned within the ICP torch, and may optionally be supported by a capillary rack. The tubing may run through an inner tube of the ICP torch. A terminal end of the tubing may be mounted within a nozzle of the inner tube.

The ICP torch 38 may generate a spray 31 (e.g., microspray) at a sample outlet. The ICP torch may generate plasma gas and control carrier and auxiliary gas. The spray may include the sample droplets that are ionized in the plasma and transported to a sample cone for a downstream mass analyzer 39. In some embodiments, the spray angle may be controlled by tuning carrier gas inflow within the ICP torch. In some embodiments, a small spray angle may be desirable to increase the ion transportation to the sample cone, which may increase the ICP-MS sensitivity. For instance, the spray angle may be less than or equal to about 20 degrees, 15 degrees, 12 degrees, 10 degrees, 9 degrees, 8 degrees, 7 degrees, 6 degrees, 5 degrees, 4 degrees, 3 degrees, 2 degrees, or 1 degree.

The mass analyzer 39 may be an ICP mass spectrometer. The mass analyzer may detect the individual particles and analyze trace elements. The mass analyzer may be capable of detecting metals and/or nonmetals at desired concentrations. For instance, the concentrations may be as low as one part in 1015, optionally on non-interfered low-background isotopes. The mass analyzer may receive the atomized and ionized sample and may separate and quantify the ions.

The systems and methods provided herein may be capable of achieving a high level of sample transportation efficiency. For instance, the system provided herein may sequential transport droplets encapsulating single particles to plasma, and achieve at least a 75%, 80%, 85%, 90%, 95%, 97%, 99%, 99.5%, or 99.9% sample transportation efficiency. In some embodiments, the various components, such as the droplet generator, conveyance module, tubing, ICP torch, and/or any adapters may be closely connected to increase the efficiency of the sample delivery, atomization, and ionization, which may greatly enhance specificity and sensitivity. In some instances, the physical components may be closely located to one another. For instance, the various physical components may be capable of being located within a single room, a single benchtop, a 5 $m^3$ volume, a 3 $m^3$ volume, a 1 $m^3$ volume, a 0.5 $m^3$ volume, a 0.3 $m^3$ volume, a 0.1 $m^3$ volume, a 0.05 $m^3$ volume, a 0.03 $m^3$ volume, or a 0.01 $m^3$ volume. Optionally, other intervening components may not be provided or necessary.

Figure 2:
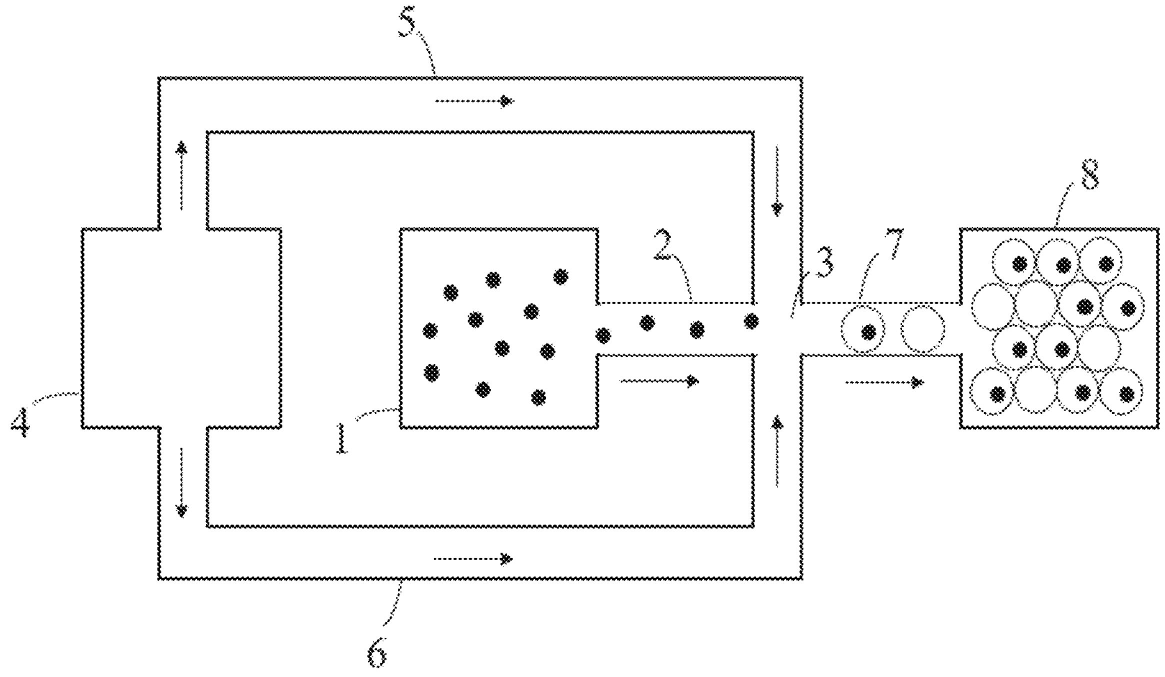
FIG. 2 shows a schematic of a droplet generator, in accordance with embodiments of the invention.

FIG. 2 shows a schematic of a droplet generator, in accordance with embodiments of the invention. The droplet generator may be used to generate and deliver single particle droplets suitable for ICP-MS sampling. The droplet generator may be a module which may include a microfluidic chip for droplet generation. The droplet generator may include one channel or multiple channels on a microfluidic chip to form sample droplets which may contain single particles. The particles may be cells, beads, aerosols, or other types of particles, as described elsewhere herein. The droplets may be generated by merging uniform or non-uniform distributed particle suspension with a carrier fluid. The carrier fluid may be an oil, such as described elsewhere herein. The merging may form water-in-oil droplets.

The droplet generator may be provided as a microfluidic chip. The microfluidic chip may be formed from any materials, such as polydimethylsiloxane (PDMS), polymethylmethacrylate (PMMA), polycarbonate (PC), polystyrene (PS), polypropylene (PP) or the family of cyclic olefin copolymers (COC).

The droplet generator may advantageously allow for generation of the single sample droplets. This may allow for the particle samples to be partitioned in space and then the particle samples can be delivered one after another to the ICP torch.

The droplet generator may include a sample chamber 1 or source. The sample chamber may contain a particle sample suspension. The particle sample suspension may be provided to the sample chamber at the beginning of an analyzing process, or may be continuously provided throughout the analyzing process. The sample may be provided in a continuous fashion or a batch fashion. In some instances, the initial sample provided may be less than or equal to about 100 mL, 50 mL, 30 mL, 20 mL, 10 mL, 5 mL, 3 mL, 1 mL, 0.5 mL, 0.3 mL, 0.1 mL, 0.05 mL, or 0.01 mL. The initial sample provided may be greater than any of the values provided or fall within a range between any two of the values provided. The sample chamber may be enclosed or may be open. In some instances, the sample chamber may be closed after the sample is provided. In some instances, a port or other opening may be provided to receive the sample.

The sample chamber 1 may be in fluidic communication with a sample fluid channel 2. The sample fluid channel may remain in fluidic communication with the sample chamber, or may be selectively in and out of fluidic communication with the sample chamber. In some embodiments, a controller, such as a valve may be provided to control fluid flow between the sample chamber and the sample fluid channel. In some embodiments, the flow of the particle sample suspension from the sample chamber to the sample fluid channel may be driven by positive pressure. For instance, a compressed air flow or mechanical injection pump may be provided to drive the flow of the particle sample suspension from the sample chamber to the sample fluid channel. In some instances, negative pressure may pull the particle sample suspension along the channel. In some instances, a single sample fluid channel is provided. Alternatively multiple sample fluid channels may be provided. The flow of sample to a selected sample fluid channel may be controlled by a valve or switch.

The droplet generator may include a carrier chamber 4 or source. The carrier chamber may contain a carrier fluid, such as oil. The carrier fluid may have any characteristics as described elsewhere herein. The carrier fluid may be provided to the carrier chamber at the beginning of an analyzing process, or may be continuously provided throughout the analyzing process. In some instances, the carrier fluid provided may be less than or equal to about 500 mL, 300 mL, 100 mL, 50 mL, 30 mL, 20 mL, 15 mL, 10 mL, 5 mL, 3 mL, 1 mL, 0.5 mL, 0.3 mL, 0.1 mL, or 0.05 mL. The carrier provided may be greater than any of the values provided or fall within a range between any two of the values provided. The carrier chamber may be enclosed or may be open. In some instances, the carrier chamber may be closed after the carrier is provided. In some instances, a port or other opening may be provided to receive the carrier. In some instances, the carrier chamber may have a volume greater than or equal to the sample chamber.

The carrier chamber 1 may be in fluidic communication with one or more carrier channels 5, 6. In some instances, two or more, three or more, four or more, five or more, or eight or more carrier channels may be provided. A carrier channel may remain in fluidic communication with the carrier chamber, or may be selectively in and out of fluidic communication with the carrier chamber. In some embodiments, a controller, such as a valve may be provided to control fluid flow between the carrier chamber and a carrier fluid channel. In some instances, a metering element, or a controller may be used to control fluid flow from a carrier chamber to multiple carrier fluid channels. In some embodiments, the flow of the carrier fluid from the carrier chamber to one or more carrier channels may be driven by positive pressure. For instance, a compressed air flow or mechanical injection pump may be provided to drive the flow of the carrier fluid from the carrier chamber to the carrier fluid channels. In some instances, negative pressure may pull the carrier fluid along the channel. In some instances, a single carrier channel is provided. Alternatively multiple carrier channels may be provided. The flow of carrier fluid to a selected carrier channel may be controlled by a valve or switch.

One or more sample fluid channels 2 may intersect with one or more carrier channels 5, 6. For example, a single sample fluid channel may intersect with two or more carrier channels. The channels may intersect at an intersection area 3. In some instances, the channels may intersect at different directions. For example, two carrier channels having fluid flow in substantially opposite directions may intersect at the intersection area. A sample channel may have fluid flow in a substantially perpendicular direction relative to one or more carrier channels. A sample channel may have fluid flow in a non-parallel direction relative to one or more carrier channels. Alternatively, a sample channel may have fluid flow in a substantially opposite direction relative to one or more carrier channels. A difference in direction of the various channels that may meet at an intersection may be at least 15 degrees, 30 degrees, 45 degrees, 60 degrees, 75 degrees, 90 degrees, 150 degrees, or 180 degrees. The carrier channel(s) and sample fluid channel(s) may remain substantially coplanar. Alternatively, one or more of the channels may not be coplanar with the others. The sample fluid channel(s) and/or carrier channel(s) may or may not have the same diameter. The sample fluid channel (s) and/or the carrier channel(s) may or may not be formed from the material, have the same friction on their interiors, have the same cross-sectional shapes, or any other characteristics.

At the intersection area 3, the particle sample solution may meet with the carrier fluid. They may form aqueous droplets. Optionally, sample droplets may be formed where a single particle is suspended within a droplet of a carrier fluid. In some embodiments, each droplet formed in the intersection area may have a particle suspended therein. Alternatively, some carrier droplets may be formed which may not have a particle therein. In some embodiments, intersection area with the convergence of the channel may be configured so that are least 30%, 40%, 50%, 60%, 70%, 80%, 90%, 95%, 97%, or 99% of the droplets formed in the intersection area have a sample particle therein.

A collection channel 7 may be provided in fluidic communication with the intersection area. The sample droplets may flow from the intersection area to the collection channel. A collection channel may remain in fluidic communication with the intersection area, or may be selectively in and out of fluidic communication with the intersection area. In some embodiments, a controller, such as a valve may be provided to control fluid flow between the intersection area and a collection channel. In some embodiments, the flow of the sample droplets from the intersection area to one or more collection channels may be driven by positive pressure. For instance, a compressed air flow or mechanical injection pump may be provided to drive the flow of the sample droplets from the intersection area to the collection channel. In some instances, negative pressure may pull the sample droplets along the collection channel. In some instances, a single collection channel is provided. Alternatively multiple collection channels may be provided. The flow of sample droplets to a selected collection channel may be controlled by a valve or switch.

The collection channel 7 may be sized or shaped to form a desired size of sample droplet. For instance, an inner diameter of the collection channel may be sized within a desired range to reduce the volume of the sample droplets, which may facilitate subsequent vaporization and/or atomization of the sample droplets. This may allow for improved ionization efficiency in the plasma. In some instances, it may be desirable for the collection channel to have an inner diameter of less than or equal to 10 μm, 20 μm, 30 μm, 40 μm, 50 μm, 60 μm, 70 μm, 80 μm, 90 μm, 100 μm, 120 μm, 150 μm, or 200 μm. The collection channel may have an inner diameter greater than any of the values provided herein, or falling within a range between any two of the values provided herein. The collection channel may comprise a capillary tube that has an inner diameter that matches an outer diameter of the individual sample droplets.

Optionally, the collection channel may convey the sample droplets to a collection chamber 8. The collection chamber may receive the sample droplets prior to further conveyance of the sample droplets via a conveyance module. Alternatively, the collection chamber may not be required and sample droplets may be directly conveyed to a conveyance module. The collection chamber may be enclosed or may be open. In some instances, the collection chamber may have a volume greater than or equal to the sample chamber or the carrier chamber.

Any of the chambers and/or channels described herein may be closed. The chambers and/or channels described herein may not be directly exposed to the ambient environment. Alternatively, one or more surface or side may be open, or exposed to the ambient environment.

In some instances, the droplet generator may be of a small size. For instance, a microfluidic chip may be provided which may have a footprint of less than or equal to about 100 $cm^2$, 80 $cm^2$, 60 $cm^2$, 50 $cm^2$, 40 $cm^2$, 30 $cm^2$, 20 $cm^2$, 15 $cm^2$, 10 $cm^2$, 8 $cm^2$, 7 $cm^2$, 6 $cm^2$, 5 $cm^2$, 4 $cm^2$, 3 $cm^2$, 2 $cm^2$, or 1 $cm^2$.

The droplet generator may or may not have a controlled temperature. In some embodiments, the droplet generator may have a controlled temperature to provide desired characteristics of the carrier and/or sample. For instance, viscosity may be affected by the temperature. One or more heating elements and/or cooling elements may be provided to control the temperature of the droplet generator. In some instances, the temperature of the droplet generator, or any other component of the sample transport system, may be controlled to any desired degree, such as within 3 degrees, 2 degrees, 1 degree, 0.5 degrees, 0.1 degrees, 0.05 degrees, 0.01 degrees, 0.005, or 0.001 degrees C.

A droplet generator may or may not use one or more sensors. The droplet generator may or may not use sensors to determine when a collection chamber is full and/or when all of the sample and/or carrier has been used. A sensor may collect data which may be processed with aid of one or more processors. The processors may aid in the control of a pump in the conveyance module and/or droplet generator.

One or more processors may receive data from one or more sensors on-board the droplet generator. The one or more processors may execute instructions provided in a memory. The memory may comprise non-transitory computer readable media that may include code, logic, or instructions for performing one or more steps. The one or more processors may send a signal to a pump or valve in the droplet generator and/or conveyance module. The one or more processors may be part of a control system of the droplet generator and/or the entire sample transport apparatus.

Figure 3:
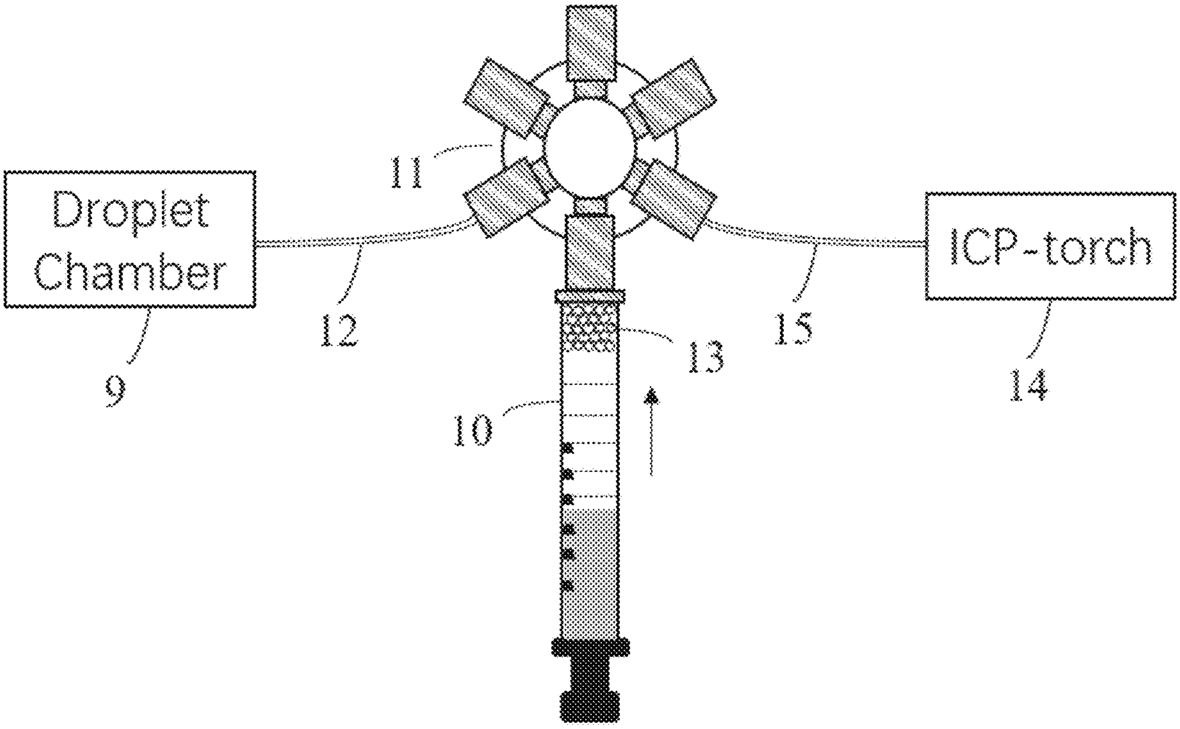
FIG. 3 shows a schematic of a conveyance module for individual sample particles, in accordance with embodiments of the invention.

FIG. 3 shows a schematic of a conveyance module for individual sample particles, in accordance with embodiments of the invention. The conveyance module may receive sample droplets from the droplet generator, and may convey the sample droplets from the droplet generator to the ICP torch.

The conveyance module may be an automation-controlled syringe pump module. Although the syringe pump module is provided by way of example, the conveyance module may have any other configuration that may allow for individual sequential transport of sample droplets to the ICP torch. The conveyance module may allow for a single droplet to be transported to the ICP torch at a time. The individual droplets may be kept separate. The conveyance module may be able to control the rate at which the sample droplets are provided to the ICP torch.

The conveyance module may receive sample droplets from a droplet chamber 9. The droplet chamber may be a location where sample droplets may be temporarily stored. The droplet chamber may be the same chamber as the collection chamber 8 of the droplet generator. Any description herein of a droplet chamber may also apply to the collection chamber. Alternatively, the droplet chamber may be a different chamber from the collection chamber. In some instances, sample droplets may be conveyed from the collection chamber to the droplet chamber. The sample droplets may be conveyed with aid of a tube, channel, pipette, or any other mechanism.

A droplet chamber 9 may be in fluidic communication with an inlet path 12. The inlet path may be a tube, channel, or any other type of mechanism. The inlet path may remain in fluidic communication with the droplet chamber, or may be selectively in and out of fluidic communication with the droplet chamber. In some embodiments, a controller, such as a valve may be provided to control fluid flow between the droplet chamber and the inlet path. In some instances, negative pressure may pull the sample droplets along the inlet path. For instance, a downstream syringe pump mechanism may pull the sample droplets along the inlet path. In some embodiments, the flow of the sample droplets from the droplet chamber to the inlet path may be driven by positive pressure. For instance, a compressed air flow or mechanical injection pump may be provided to drive the flow of the particle sample suspension from the sample chamber to the sample fluid channel. In some instances, a single inlet path is provided. Alternatively multiple inlet paths may be provided.

In some alternative embodiments, a droplet chamber need not be provided. In some instances, a collection chamber of a droplet generator may also not be necessary. In some instances, a collection channel may be directly converted to an inlet path 12, or may be the same as an inlet path. The inlet path may be formed from a rigid material, or may be formed from a flexible material.

The inlet path may be sized or shaped to accommodate the sample droplets. For instance, the inlet path may have an inner diameter that may control the volume of the sample droplets. The inlet path may have an inner diameter that may match or be greater than the diameter of the sample droplets, and allow the conveying of the sample droplets. For instance, the inlet path may have an inner diameter of more than or equal to 10 μm, 20 μm, 30 μm, 40 μm, 50 μm, 60 μm, 70 μm, 80 μm, 90 μm, 100 μm, 120 μm, 150 μm, or 200 μm. The inlet path may have an inner diameter less than any of the values provided herein, or falling within a range between any two of the values provided herein.

The inlet path may lead to a switching valve 11, which is coupled to a syringe pump 10. The inlet path may deliver the sample droplets to the syringe pump via the switching valve. As the density of the sample droplets may be lower than background carrier (e.g., oil), the sample droplets 13 may float beyond the background carrier. The sample droplets may be aqueous droplets. The sample droplets may float above the background carrier within the syringe after standing for a specified period of time. The specified period of time may be less than or equal to 5 minutes, 3 minutes, 2 minutes, 1 minute, 30 seconds, 20 seconds, 10 seconds, 5 seconds, 3 seconds, or 1 second.

The syringe may have any desired volume or configuration. For instance, the syringe may be sufficiently sized to accept the droplets and/or background carrier. In some instances, the syringe may be capable of accepting a volume of at least 100 mL, 75 mL, 50 mL, 40 mL, 30 mL, 25 mL, 20 mL, 15 mL, 10 mL, 8 mL, 6 mL, 5 mL, 4 mL, 3 mL, 2 mL, 1 mL, 0.5 mL, or 0.1 mL. The syringe pump may have a substantially vertical configuration. A longitudinal axis of the syringe pump may be substantially parallel to the direction of gravity, or may be within less than 15 degrees, 10 degrees, 7 degrees, 5 degrees, 3 degrees, 2 degrees, or 1 degree of the direction of gravity. Having the substantially vertical orientation may allow the sample droplets to float towards the top of the syringe, above the background carrier.

In some embodiments, the sample droplets may be delivered to the syringe pump in batches. For instance, the switching valve may create a fluid path that may allow the sample droplets to flow from the inlet path into the syringe pump. After the droplets have gathered over the carrier fluid, the switching valve may adjust and create a fluid path that may allow the sample droplets to be injected into an outlet path 15 and toward an ICP torch 14. In some embodiments, the syringe may automatically inject everything within the syringe into the outlet path. This may include the sample droplets first, followed by the background carrier. Alternatively, the syringe may inject only the sample droplets, while keeping the background carrier within the syringe. This may be done based on timing and/or calculations to estimate the amount that the syringe needs to depress to inject the sample droplets. In another example, one or more sensors may be employed to determine the level at which the sample droplets are floating and the degree to which the syringe should be depressed to inject the sample droplets into the outlet path without necessarily injecting the background carrier.

In some instances, the syringe may be manually controlled. For instance, when a user may observe the sample droplets entering the syringe, and may adjust the valve and eject the sample droplets to the outlet path using the syringe. In other instances, the valve and/or syringe pump may be automatically controlled. In some instances, the valve and/or syringe pump may operate based on a predetermined time or schedule. For instance, sample droplets may be delivered to the syringe via the inlet path for a predetermined amount of time. When the time has elapsed, the valve may be adjusted to allow the syringe to be in communication with the outlet path, and the syringe may be used to eject the sample droplets to the outlet path. The syringe may then be primed for the next batch of sample droplets, and the valve may be adjusted to allow the syringe to be in communication with the inlet path once more. The amount of time for each step may be determined by a user, or may be pre-set. In some instances, the amount of time may be controlled with aid of one or more processor.

In other instances, the timing and/or activities of the valve and/or syringe pump may be controlled in response to a detected event. For instance, one or more sensors may be provided. The sensors may be used to detect the flow of the sample droplets and/or carrier fluid. The sensors may detect when a desired amount of sample droplets have entered the syringe. The valves may then be automatically adjusted, and the syringe pump may be used to eject the sample droplets to the outlet path. Any type of sensors may be employed to detect one or more conditions that may result in the control of the valve and/or syringe. For instance, optical sensors, temperature sensors, impedance sensors, acoustic sensors, ultrasonic sensors, laser sensors, pressure sensors, or any other sensors may be employed. In some instances, a single type of sensor, or multiple types of sensors may be used.

Data from the sensors may be provided to one or more processors. The data from a single or multiple sensors may be analyzed by the one or more processors. The one or more processors may provide instructions that may control activities of the valve and/or syringe. The one or more processors may send a signal to a rotor of the valve to switch and/or maintain the position of the rotor. The one or more processors may send a signal to the pump to cause the pump to inject the sample droplets and/or return to an open position. The one or more processors may send a signal that may determine the extent to which the pump is depressed. Alternatively, the pump may depress by the same amount regardless of the sensor data. The one or more processors may be part of a control system of the conveyance module and/or the entire sample transport apparatus.

Figure 4:
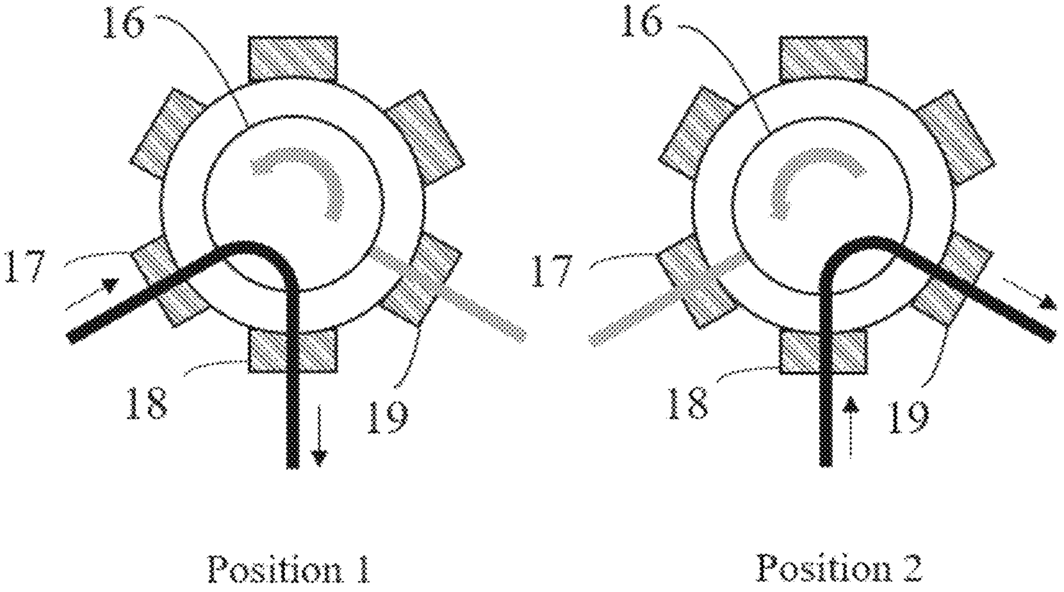
FIG. 4 shows a schematic of fluid paths that may be controlled within a conveyance module, in accordance with embodiments of the invention.

FIG. 4 shows a schematic of fluid paths that may be controlled within a conveyance module, in accordance with embodiments of the invention. As previously described a switching valve 11 may be provided as part of the conveyance module. The switching valve may adjust the fluid paths as illustrated. The switching valve may switch between a first position and a second position. In alternative embodiments, any number of positions may be employed.

When a valve is in a first position, a fluid path may be provided between an inlet path and a syringe pump. A first port 17 and a second port 18 may be connected and aligned, which may allow the fluid communication between the inlet path and the syringe pump. This may allow sample droplets and/or carrier fluid to be transferred to the syringe.

When a valve is in a second position, a fluid path may be provided between a syringe pump and an outlet path. A second port 18 and a third port 19 may be connected and aligned, which may allow the fluid communication between the syringe pump and the outlet path. This may allow sample droplets and/or carrier fluid to be transferred from the syringe to the outlet path, and subsequently to an ICP torch.

A pair of rotor/stators 16 may be provided. An inner rotor may cause the inner portion of the valve to move, which may cause the fluid path to move. The fluid path may have a curved shape, as illustrated. The angle of the curve may be any angle. For instance, the angle of the curve may be less than, greater than, or equal to about 15 degrees, 30 degrees, 45 degrees, 60 degrees, 75 degrees, 90 degrees, 120 degrees, 150 degrees, or 180 degrees. The angle of the curve may have a value falling in a range between any two of the values provided. The fluid path may have any size or dimension. For instance, the fluid path may have an inner diameter greater than, equal to, or less than the diameter of the inlet path and/or outlet path.

The stator may optionally remain stationary. The stator may hold the positions of the first, second, and third ports. The motion of the rotor may be controlled by one or more actuator. The actuator may allow the rotor to move back and forth between the first and second positions. In alternative embodiments, the actuator may allow the rotor to move to other positions. In some instances, the rotor may only need to move back and forth a single time to convey sufficient sample to be analyzed by the downstream mass analyzer. Alternatively, the rotor may move back and forth multiple times to convey a desired amount of sample to be analyzed by the downstream mass analyzer. Similarly, the syringe may operate a single time to convey sufficient sample to be analyzed by the downstream mass analyzer. Alternatively, the syringe may operate multiple times, to inject a sufficient amount of sample to be analyzed by the downstream mass analyzer.

The conveyance method as illustrated advantageously allows the switching valve to dynamically alternate between fluid paths without manually disconnecting plumbing or manually switching. This may advantageously provide robustness and reliability to the conveyance mechanism. This may reduce the likelihood that malfunctions may occur, or that portions of the conveyance mechanism stop working.

The outlet path 15 may receive the sample droplets from the syringe and convey the sample droplets in a sequential manner to the ICP torch. The conveyance mechanism may allow the sample droplets to be conveyed at a desired rate and/or at a desired volume or number. The conveyance mechanism may ensure that the droplets being conveyed to the outlet path are sample droplets that contain the sample particle therein.

The outlet path may have any configuration. In some instances, the outlet path may have the same characteristics as an inlet path. The outlet path may be a tube, channel, or other mechanism that may allow the sample droplets to flow. The outlet path may have an inner diameter less than, greater than, or equal to an inner diameter of an inlet path or a collection channel. The outlet path may convey single sample droplets at a time in a sequential manner.

The outlet path may convey the sample droplets to an ICP torch 14. In some embodiments, the outlet path may connect to a capillary tube that may enter within an inner portion of the ICP torch. In some embodiments, the outlet path and the capillary tube may be the same integral piece.

Figure 5:
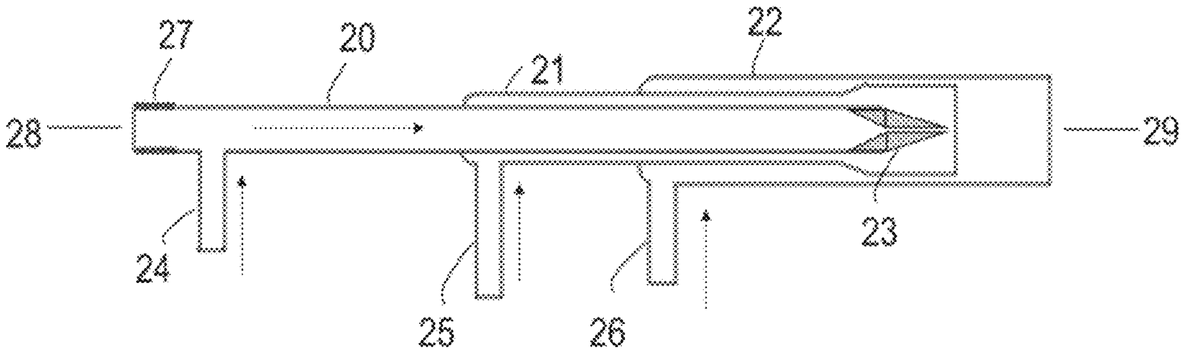
FIG. 5 shows a side view of an integrated inductively coupled plasma (ICP) torch, in accordance with embodiments of the invention.

FIG. 5 shows a side view of an ICP torch, in accordance with embodiments of the invention. The ICP torch may be an ICP quartz torch. The ICP torch may optionally have multiple layers. In some embodiments, the ICP torch may have at least three layers. For instance, the ICP torch may include an inner layer 20, a middle layer 21, and an outer layer 22. The layers may have any shape or configuration. In some instances, the layers may be tubes, such as cylinders. The layers may be prisms, or may have any cross-sectional shape. The layers may extend in a longitudinal direction an along a length of the ICP torch.

In some embodiments, the layers may be arranged in a concentric arrangement. For instance, an inner tube 20, a middle tube 21, and an outer tube 22 may be arranged in a concentric fashion with the inner tube within the middle tube, and the middle tube within the outer tube. The layers may be co-axial. The centers of each of the layers may or may not align. In some embodiments, each of the layers may be arranged in a staggered manner. For instance, a portion of the inner tube may extend beyond the middle tube, and/or a portion of the middle tube may extend out beyond the outer tube. Similarly, an end of the outer tube may extend out beyond an end of the middle tube, and/or an end of the middle tube may extend out beyond an end of the inner tube. The various layers may have different lengths, or may have the same lengths.

An inner tube 20 may have a carrier gas inlet 24. The carrier gas inlet may be provided at or near an end of the inner tube. The carrier gas inlet may be at or near an end of the inner tube facing an outlet path configured to deliver sample droplets. In some instances, a single carrier gas inlet may be provided. Alternatively, multiple carrier gas inlets may be provided. The carrier gas inlet may be connected to a carrier gas source. Valves or other controllers that may control the flow of the carrier gas may be provided at the carrier gas inlet, and/or at the carrier gas source. In some instances, the carrier gas inlet may be a tube protruding from the inner tube. The carrier gas inlet may be substantially perpendicular to the inner tube. The carrier gas inlet may be non-parallel to the inner tube. In some instances, the carrier gas inlet may have a substantially vertical configuration. The carrier gas inlet may be substantially parallel to a direction of gravity. The carrier gas may enter the inner tube via the carrier gas inlet. The carrier gas may flow along the length of the inner tube to a distal end of the inner tube. Optionally, a nozzle 23 may be provided at the distal end of the inner tube. The distal end of the inner tube may be an end of the inner tube facing away from the outlet path that may deliver sample droplets.

Examples of carrier gas may include argon, helium, xenon, neon, nitrogen, or compressed air.

A middle tube 21 may have an auxiliary gas inlet 25. The auxiliary gas inlet may be provided at or near an end of the middle tube. The auxiliary gas inlet may be at or near an end of the middle tube facing an outlet path configured to deliver sample droplets. In some instances, a single auxiliary gas inlet may be provided. Alternatively, multiple auxiliary gas inlets may be provided. The auxiliary gas inlet may be connected to an auxiliary gas source. Valves or other controllers that may control the flow of the auxiliary gas may be provided at the auxiliary gas inlet, and/or at the auxiliary gas source. In some instances, the auxiliary gas inlet may be a tube protruding from the middle tube. The auxiliary gas inlet may be substantially perpendicular to the middle tube. The auxiliary gas inlet may be non-parallel to the middle tube. In some instances, the auxiliary gas inlet may have a substantially vertical configuration. The auxiliary gas inlet may be substantially parallel to a direction of gravity. The auxiliary gas may enter the middle tube via the auxiliary gas inlet. The auxiliary gas may flow along the length of the middle tube to a distal end of the middle tube. The distal end of the middle tube may be an end of the middle tube facing away from the outlet path that may deliver sample droplets.

The auxiliary gas inlet may have a similar configuration as a carrier gas inlet. Alternatively, one or more characteristics between the auxiliary gas inlet and the carrier gas inlet may be different. For instance, the inner diameter of the auxiliary gas in let may be less than, greater than, or equal to the inner diameter of the carrier gas inlet. The length of the auxiliary gas in let may be less than, greater than, or equal to the length of the carrier gas inlet.

Examples of auxiliary gas may include argon, helium, xenon, neon, nitrogen, or compressed air.

An outer tube 22 may have a plasma gas inlet 26. The plasma gas inlet may be provided at or near an end of the outer tube. The plasma gas inlet may be at or near an end of the outer tube facing an outlet path configured to deliver sample droplets. In some instances, a single plasma gas inlet may be provided. Alternatively, multiple plasma gas inlets may be provided. The plasma gas inlet may be connected to a plasma gas source. Valves or other controllers that may control the flow of the plasma gas may be provided at the plasma gas inlet, and/or at the plasma gas source. In some instances, the plasma gas inlet may be a tube protruding from the outer tube. The plasma gas inlet may be substantially perpendicular to the outer tube. The plasma gas inlet may be non-parallel to the outer tube. In some instances, the plasma gas inlet may have a substantially vertical configuration. The plasma gas inlet may be substantially parallel to a direction of gravity. The plasma gas may enter the outer tube via the plasma gas inlet. The plasma gas may flow along the length of the outer tube to a distal end of the outer tube. The distal end of the outer tube may be an end of the outer tube facing away from the outlet path that may deliver sample droplets.

The plasma gas inlet may have a similar configuration as a carrier gas inlet or an auxiliary gas inlet. Alternatively, one or more characteristics between the plasma gas inlet and the carrier gas inlet or the auxiliary gas inlet may be different. For instance, the inner diameter of the plasma gas in let may be less than, greater than, or equal to the inner diameter of the carrier gas inlet or the auxiliary gas inlet. The length of the plasma gas in let may be less than, greater than, or equal to the length of the carrier gas inlet or the auxiliary gas inlet.

Examples of plasma gas may include argon, helium, xenon, neon, nitrogen, or compressed air. In some embodiments, argon gas may be used to create the plasma.

The inner tube 20 may optionally have a screw thread 27 and/or a ball joint at the sample inlet 28. A mechanism may be placed at a proximal end of the inner tube that may ensure tight sealing to maintain the pressure inside the inner tube. The proximal end of the inner tube may be an end of the tube facing the outlet path and configured to receive the sample droplets. The screw thread and/or ball joint may be fluid tight and may ensure sufficiently tight sealing to maintain the desired pressure within the inner tube. In some instances, the mechanism at the proximal end may allow the inner tube to reach and/or maintain a pressure of at least 50 kPa. The inner tube may reach and/or maintain a pressure of at least 30 kPa, 40 kPa, 45 kPa, 55 kPa, 60 kPa, 70 kPa, 80 kPa or any other value.

The outer tube may be provided within a load coil where plasma is generated. The load coil may be a radiofrequency (RF) load coil. The load coil may be formed from and/or plated with a metal, such as copper, silver, or any other metal.

Figure 6:
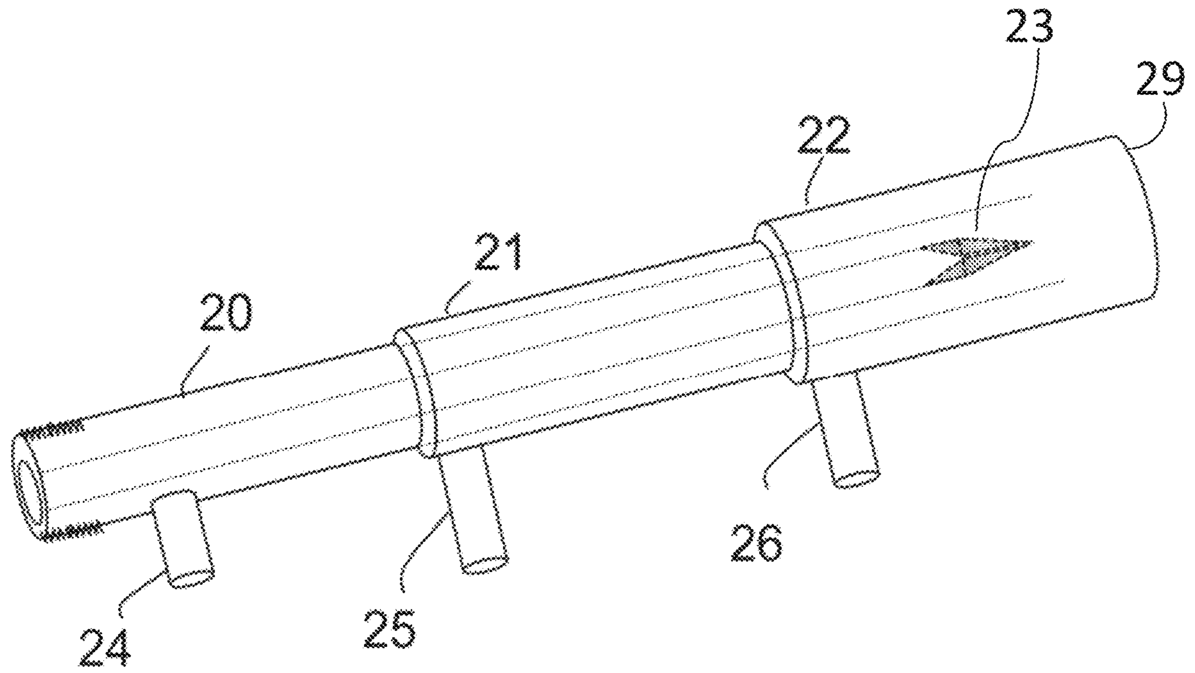
FIG. 6 shows a perspective view of an integrated ICP torch, in accordance with embodiments of the invention.

FIG. 6 shows a perspective view of an integrated ICP torch, in accordance with embodiments of the invention. As previously described, the ICP torch may include an inner tube 20 with a carrier gas inlet 24, a middle tube 21 with an auxiliary gas inlet 25, and an outer tube 22 with a plasma gas inlet.

A proximal end of the inner tube may include a closure mechanism, such as a screw thread 27 or ball joint. This may allow a desired pressure within the inner tube to be maintained.

The proximal end of a middle tube may meet an outer surface of the inner tube. The inner tube and middle tube may be two separate or separable pieces, or may be permanently fixed to one another. The inner tube and middle tube may alternatively be formed from a single integral piece. The proximal end of the middle tube may couple to the inner tube in a manner that allows a desired pressure to be maintained within the middle tube. For instance, a fluid-tight seal may be maintained, and may force the flow of the auxiliary gas to a distal end of the middle tube.

The proximal end of an outer tube may meet an outer surface of the middle tube. The middle tube and outer tube may be two separate or separable pieces, or may be permanently fixed to one another. The middle tube and outer tube may alternatively be formed from a single integral piece. The proximal end of the outer tube may couple to the middle tube in a manner that allows a desired pressure to be maintained within the outer tube. For instance, a fluid-tight seal may be maintained, and may force the flow of the plasma gas to a distal end of the outer tube.

The tubes may be formed from any material. In some embodiments, the tubes may be formed from quartz glass. The tubes may be formed from a rigid material.

The various gases within the tubes may flow at any rate. In some embodiments, it may be desirable for the carrier gas to flow at 0.5-1.5 L/min. The carrier gas may have a flow rate of at least 0.1, 0.3, 0.5, 0.7, 1.0, 1.2, 1.5, 2.0, 2.5, 3.0, 4.0, or 5.0 L/min. The carrier gas may have a flow rate less than any of the values provided herein, or falling within a range between any two of the values provided herein. Optionally, it may be desirable for the auxiliary gas to flow at 0-1.0 L/min. The auxiliary gas may have a flow rate of at least 0, 0.01, 0.05, 0.1, 0.2, 0.3, 0.5, 0.7, 1.0, 1.2, 1.5, 2.0, 3.0, or 5.0 L/min. The auxiliary gas may have a flow rate less than any of the values provided herein, or falling within a range between any two of the values provided herein. The auxiliary gas may have a flow rate lower than the flow rate of the carrier gas.

In some instances, it may be desirable for the plasma gas to flow at 10-15 L/min. The plasma gas may have a flow rate of at least 0, 1, 2, 3, 5, 7, 9, 10, 11, 12, 13, 14, 15, 17, 20, 30, or 50 L/min. The plasma gas may have a flow rate less than any of the values provided herein, or falling within a range between any two of the values provided herein. The plasma gas may have a flow rate greater than the flow rate of the carrier gas or the auxiliary gas.

The inner tube may include a nozzle 23 at the distal end. The nozzle may be provided at an outlet for the carrier gas. The nozzle may be a substantially cone shaped nozzle. A tube for conveying sample droplets may lead the sample droplets to the nozzle.

The nozzle 23 may be in a proximity of the sample outlet 29. The nozzle may optionally have a plain orifice which may prevent or reduce large droplet accumulation at the outlet. Large droplets may destabilize plasma, which can lead to reduced ionizing efficiency.

The cone-shaped nozzle may have any shape or angle. For instance, the cone may be provided with an angle substantially less than or equal to about 5 degrees, 10 degrees, 15 degrees, 20 degrees, 25 degrees, 30 degrees, 45 degrees, or 60 degrees relative to an axis extending along a length of the inner tube. The angle may be greater than any of the values provided, or fall within a range between any two of the values provided.

Figure 7:
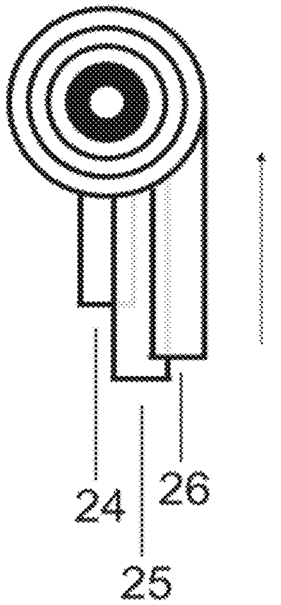
FIG. 7 shows a cross-sectional view of an integrated ICP torch, in accordance with embodiments of the invention.

FIG. 7 shows a cross-sectional view of an integrated ICP torch, in accordance with embodiments of the invention. As described above, the ICP torch may include an inner tube 20 with a carrier gas inlet 24, a middle tube 21 with an auxiliary gas inlet 25, and an outer tube 22 with a plasma gas inlet.

The carrier gas inlet may have a substantially vertical position. The carrier gas inlet may have a longitudinal axis that intersects a longitudinal axis of the inner tube. The carrier gas inlet may overlap with a central portion of the inner tube. The carrier gas may flow directly upwards into the inner tube.

The auxiliary gas inlet may have a substantially vertical orientation. The auxiliary gas inlet may or may not be substantially parallel to the carrier gas inlet. The auxiliary gas inlet may have a substantially tangential position relative to the middle tube. The auxiliary gas inlet may have a longitudinal axis that does not intersect with a longitudinal axis of the middle tube. The auxiliary gas inlet may optionally not overlap with a central portion of the middle tube. The auxiliary gas inlet may be to a side of a central portion of the middle tube. The auxiliary gas may flow upwards into the middle tube and a vortex flow rotation may be formed due to the positioning. The auxiliary gas may flow in a circumferential direction around an interior of the middle tube.

The plasma gas inlet may have a substantially vertical orientation. The plasma gas inlet may or may not be substantially parallel to the carrier gas inlet and/or the auxiliary gas inlet. The plasma gas inlet may have a substantially tangential position relative to the outer tube. The plasma gas inlet may have a longitudinal axis that does not intersect with a longitudinal axis of the outer tube. The plasma gas inlet may optionally not overlap with a central portion of the outer tube. The plasma gas inlet may be to a side of a central portion of the outer tube. The plasma gas may flow upwards into the outer tube and a vortex flow rotation may be formed due to the positioning. The plasma gas may flow in a circumferential direction around an interior of the outer tube.

The design provided may provide adequate vortex flow rotation and may direct gas in an axial direction cylindrically around the plasma. In some embodiments, the plasma gas and the auxiliary gas may have a vortex flow rotation as it also traverses the axial direction. The vortex flow may be useful for the stabilization of ICP plasma and efficient cooling of the torch. The plasma may oscillate in the absence of the vortex flow velocity, and the oscillation would extinguish the plasma. Also it could overheat the torch in the absence of the vortex flow velocity and make the torch easy to melt.

In some embodiments, the flow of the gases within the inner tube, middle tube, and/or outer tube may be controlled manually. For instance, a user may manually control a valve that may control the flow rate of the gas. Alternatively, the control of the gas flow may be provided with aid of one or more processors. One or more processors may generator a signal that may control a valve or other component that may control gas flow rate. The processors may generate the signal in response to a user instruction, parameters entered by a user, data from one or more sensors, and/or a predetermined schedule. The one or more processors may be part of a control system of the ICP torch and/or an entire sample transport apparatus.

Figure 8:
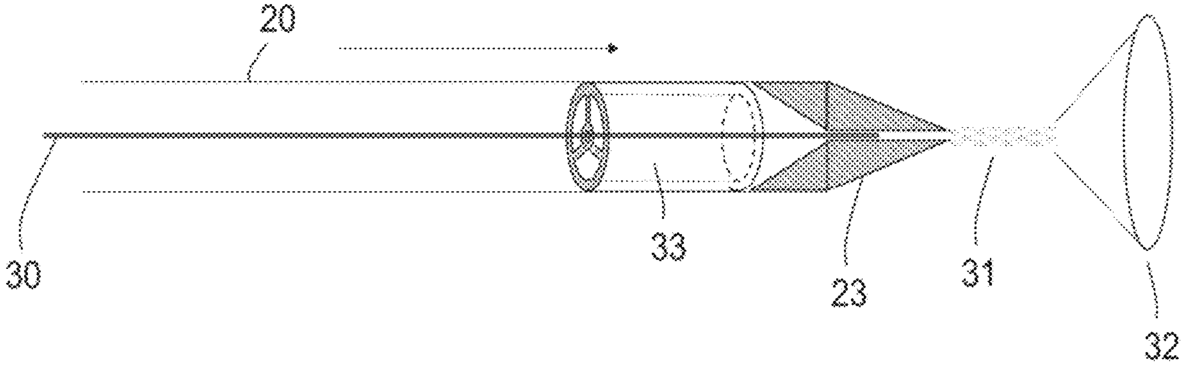
FIG. 8 shows an example of capillary tubing and an integrated ICP torch, in accordance with embodiments of the invention.

FIG. 8 shows an example of capillary tubing 30 and an integrated ICP torch, in accordance with embodiments of the invention.

The capillary tubing 30 may allow for transport of one or more sample droplets. In some embodiments, the sample droplets may sequentially traverse the capillary tubing. The conveyance module may aid in pushing the sample droplets toward the capillary tubing and/or within the length of the capillary tubing. The outlet path of the conveyance module may be the capillary tubing or may be connected to the capillary tubing. The sample droplets may be sequentially generated and transported into the capillary tubing.

The capillary tubing may be a quartz capillary tubing. The capillary tubing may be formed from a rigid material, a semi-rigid material, or from a flexible material.

The capillary tubing may have any dimensions. In some embodiments an inner diameter of the capillary tubing may be less than or equal to 10 μm, 20 μm, 30 μm, 40 μm, 50 μm, 60 μm, 70 μm, 80 μm, 90 μm, 100 μm, 120 μm, 150 μm, or 200 μm. The capillary tubing may have an inner diameter greater than any of the values provided herein, or falling within a range between any two of the values provided herein. The inner diameter of the capillary tubing may be the same as the inner diameter of a collection channel of a droplet generator, an inlet path of the conveyance module, and/or an outlet path of the conveyance module. Alternatively, the inner diameter of the capillary tubing may be greater than or less than the inner diameter of a collection channel of a droplet generator, an inlet path of the conveyance module, and/or an outlet path of the conveyance module. The inner diameter of the capillary tubing may allow the sample droplets to traverse the capillary tubing. The inner diameter of the capillary tubing may be sufficiently small to allow passage of only a single droplet at a time. The capillary tubing may have any outer diameter. For instance, the outer diameter of the capillary tubing may be less than or equal to 50 μm, 60 μm, 70 μm, 80 μm, 90 μm, 100 μm, 120 μm, 150 μm, 200 μm, 300 μm, 360 μm, 400 μm, 500 μm. The capillary tubing may have an outer diameter greater than any of the values provided herein, or falling within a range between any two of the values provided herein. The capillary tubing may allow the sample droplets to traverse the capillary tubing without requiring external pressure. Alternatively, external pressure may be applied to cause the sample droplets to traverse the capillary tubing. A positive pressure may be used to push the sample droplets along the length of the capillary tubing. For instance, a pump may be used to cause the sample droplets to traverse the capillary tubing. In some instances, the syringe pump of the conveyance module may be used to push the sample droplets to the outlet path and subsequently along the capillary tubing. A negative pressure may be used to pull the sample droplets along the length of the capillary tubing.

The capillary tubing 30 may be inserted within an inner tube 20 of the ICP torch. A connector may be provided and may be used to fix the capillary tubing and seal the sample inlet of the ICP torch 28. The connector may affix a portion of the capillary tubing relative to the inner tube. The capillary tubing may be affixed at a substantially central portion of the inner tube (e.g., within a center of a cross-section of the inner tube).

A terminal end of the capillary tubing may be mounted within a nozzle 23 of the inner tube. For instance, the terminal of the capillary tubing may be mounted within the cone-shaped nozzle. The nozzle may or may not have a solid interior. The capillary tubing may be supported within the solid interior. The terminal end of the capillary tubing may be held at a substantially central portion of the nozzle (e.g., within a center of a cross-section of the nozzle).

Carrier gas within the inner tube may flow substantially axially and exit at the nozzle. The carrier gas may have a substantially high velocity. For instance, the carrier gas may flow at rates of approximately 0.5-1.5 L/min, or any other value as described elsewhere herein. The carrier gas may be further accelerated when passing through the nozzle. The carrier gas may flow past the terminal end of the capillary tubing.

The ICP torch may issue a micro-spray 31 at a sample outlet 29. The ICP torch may issue a micro-spray at or near the proximal end of the outer tube. The micro-spray may be further atomized and ionized in the plasma. The micro-spray may then be transported to a sample cone 32 for a downstream mass analyzer 39.

The micro-spray may have any angle. In some embodiments, it may be desirable for the micro-spray to have a smaller angle, which may allow more ions to be transported to the sample cone. Having a smaller angle to the micro-spray may reduce loss of the sample ions. Thus, the ion transport may be increased or maximized using a smaller angle of micro-spray. This may result in increased ICP-MS sensitivity. By tuning carrier gas inflow, a small spray angle may be achieved. In some embodiments, the spray angle may be on the order of less than or equal to about 1 degree, 2 degrees, 3 degrees, 4 degrees, 5 degrees, 7 degrees, 10 degrees, 12 degrees, 15 degrees, 20 degrees, 25 degrees, 30 degrees, 35 degrees, or 45 degrees relative to a longitudinal axis extending through the ICP torch. The spray may have an angle greater than any of the values provided, or falling within a range between any two of the values provided.

The capillary tubing may vibrate in gas flow with a high velocity. For instance, if the carrier gas flows at a high velocity, this may cause the capillary tubing to vibrate. This may result in unstable plasma, poor resolution, and/or poor sensitivity by the mass analyzer. It may be desirable to provide a structure that may stabilize the capillary tubing within the ICP torch.

A capillary rack 33 may be provided to hold the capillary tubing 30 within the inner tube. The capillary rack may hold the capillary tubing at a substantially fixed position within the ICP torch. The capillary rack may hold the capillary tubing in a concentric position within the ICP torch. The capillary tubing may be held within a central portion of the ICP torch. The capillary tubing may be held at or near the center of a cross-section of the ICP torch. The capillary tubing may be substantially coaxial with in inner tube of the ICP torch. The capillary tubing may be substantially parallel to a longitudinal axis of the ICP torch. The capillary tubing may overlap with the longitudinal axis of the ICP torch.

The capillary rack may have any length. The capillary rack may be at least 1 mm, 3 mm, 5 mm, 1 cm, 1.5 cm, 2 cm, 3 cm, 4 cm, 5 cm, 7 cm, 10 cm, 12 cm, 15 cm, 20 cm, or 30 cm long. The capillary rack may have a length less than any of the values provided, or may fall within a range between any two of the values provided. The capillary rack may extend at least 1%, 3%, 5%, 10%, 15%, 20%, 25%, 30%, 40%, 50%, or 75% of a length of the inner tube of the ICP torch. The capillary rack may have a length extending less than any of the percentages provided, or falling within a range between any two of the percentages provided.

The capillary rack may be positioned at or near a distal end of the inner tube of the ICP torch. The capillary rack may be positioned at or near a terminal end of the capillary tubing. The capillary rack may be positioned at or near a nozzle of the inner tube. In some instances, the capillary rack may contact the nozzle or may be as close as possible to the nozzle. Alternatively, one or more gaps may be provided. The capillary rack may be positioned within 50%, 30%, 25%, 20%, 15% or 10% of the distal end of the inner tube. A single capillary rack may be provided to support the capillary tubing. Alternatively, multiple capillary racks may be provided to support the capillary tubing.

An outer diameter of the capillary rack may be sized or shaped to fit within an inner tube of the ICP torch. The outer diameter of the capillary rack may march an inner diameter of the inner tube of the ICP torch. The capillary rack may be fitted to be press-fit within the inner tube. A sufficiently frictional fit may be provided to prevent the capillary rack from sliding within the inner tube and/or along the capillary tubing. In some instances, adhesives, soldering, frictional materials, or other mechanisms may be employed to keep the capillary rack at a fixed position relative to the inner tube and/or capillary tubing.

Figure 9:
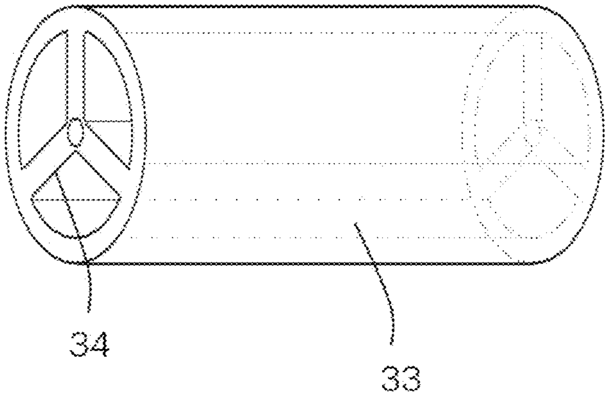
FIG. 9 shows a perspective view of a capillary rack, in accordance with embodiments of the invention.

FIG. 9 shows a perspective view of a capillary rack 33, in accordance with embodiments of the invention. The capillary rack may have a substantially cylindrical shape. The capillary rack may have a same cross-sectional shape as an inner tube of an ICP torch. For instance, if a cross-section of an inner tube of the ICP torch is a circle, the capillary rack may have a circular cross-section as well. In another example, if a cross-section of an inner tube of the ICP torch is an ellipse, the capillary rack may have an elliptical cross-section as well.

The capillary rack may be formed from any material. For instance, the capillary rack may be formed made of VESPEL. The capillary rack may be formed from any type of plastic, such as a polyimide-based plastic. The capillary rack may be formed from a high temperature plastic. The capillary rack may be formed from polyimide, polyetheretherketon, polyether imide, or polysulfon.

The capillary rack may be formed from a rigid or semi-rigid material. In some instances, the capillary rack may be formed from a flexible material. The capillary rack may be formed from a compressible or elastic material. This may allow the capillary rack to conform to the interior of the inner tube and fit snugly within.

Figure 10:
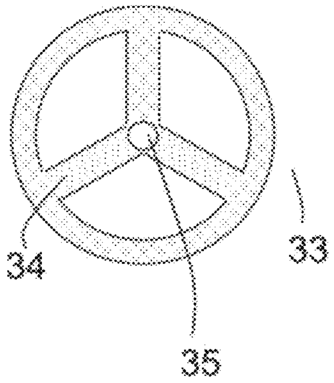
FIG. 10 shows a cross-sectional view of a capillary rack, in accordance with embodiments of the invention.

FIG. 10 shows a cross-sectional view of a capillary rack, in accordance with embodiments of the invention. The capillary rack may include one or more holes 35 passing longitudinally through the capillary rack. The hole may be used to support the capillary tubing. In some instances, the outer diameter of the capillary tubing may match the inner diameter of the hole. The shape of the exterior surface of the capillary tubing may match the cross-sectional shape of the interior surface of the hole. The capillary tubing may fit snugly within the hole. A frictional fit may be provided that may prevent the capillary tube from sliding significantly in relation to the capillary rack. The frictional fit may reduce or prevent vibrations of the capillary tube relative to the capillary rack. The capillary rack may be formed from a material that may dampen vibrations and/or reduce vibrations of the capillary tube.

The hole may be provided at a center of a cross-section of the capillary rack.

The capillary rack may also include one or more support arms 34 that may support the hole 35. In some embodiments, the capillary rack may include two or more, three or more, four or more, five or more, six or more, eight or more, or ten or more support arms. The support arms may be arranged at equal angles relative to one another. Alternatively, one or more support arms need not be arranged at equal angles. In one example, the capillary rack may have a Y-shaped configuration, which may include three support arms. In another example, the capillary rack may have a cross-shaped configuration with four support arms. The support arms may have sufficient thickness to affix the hole at a predetermined position.

Spaces may be provided between the support arms. The spaces may form channels that may allow the carrier gas to pass through. The openings for a given capillary rack may have the same shape and/or size as one another. Alternatively, one or more of the openings may have a different shape and/or size as another opening for a given capillary rack. A ratio of a cross-sectional area of the openings to a cross sectional area of the hole is greater than or equal to 15:1, 10:1, 8:1, 7:1, 6:1, 5:1, 4:1, 3:1, or 2:1.

The carrier gas may flow through the inner tube, through the channels, and out the nozzle. The carrier gas may be flowing at a high velocity. Tuning the speed of the carrier gas may affect the angle at which the sample spray is issued from the nozzle. For instance, increasing the speed of the carrier gas may cause the sample spray angle to be decreased.

The capillary rack may include an outer border. The outer border may include an outer surface of the capillary rack. The outer border may, along with the one or more support arms, surround the openings that allow carrier gas to pass through. The outer border may be an outer ring that fits snugly within the torch body. The outer border may have the same outer diameter as an inner diameter of the torch body. A frictional fit may be provided that may prevent the capillary rack from sliding within the inner tube. The outer border may provide rigidity and structure to the capillary rack. Alternatively, no outer border is required and the ends of the support arms may directly contact the inner surface of the inner tube. The outer border may form a contiguous, unbroken surface. Alternatively, one or more holes, openings, channels, or gaps may be provided on the outer border.

Figure 11:
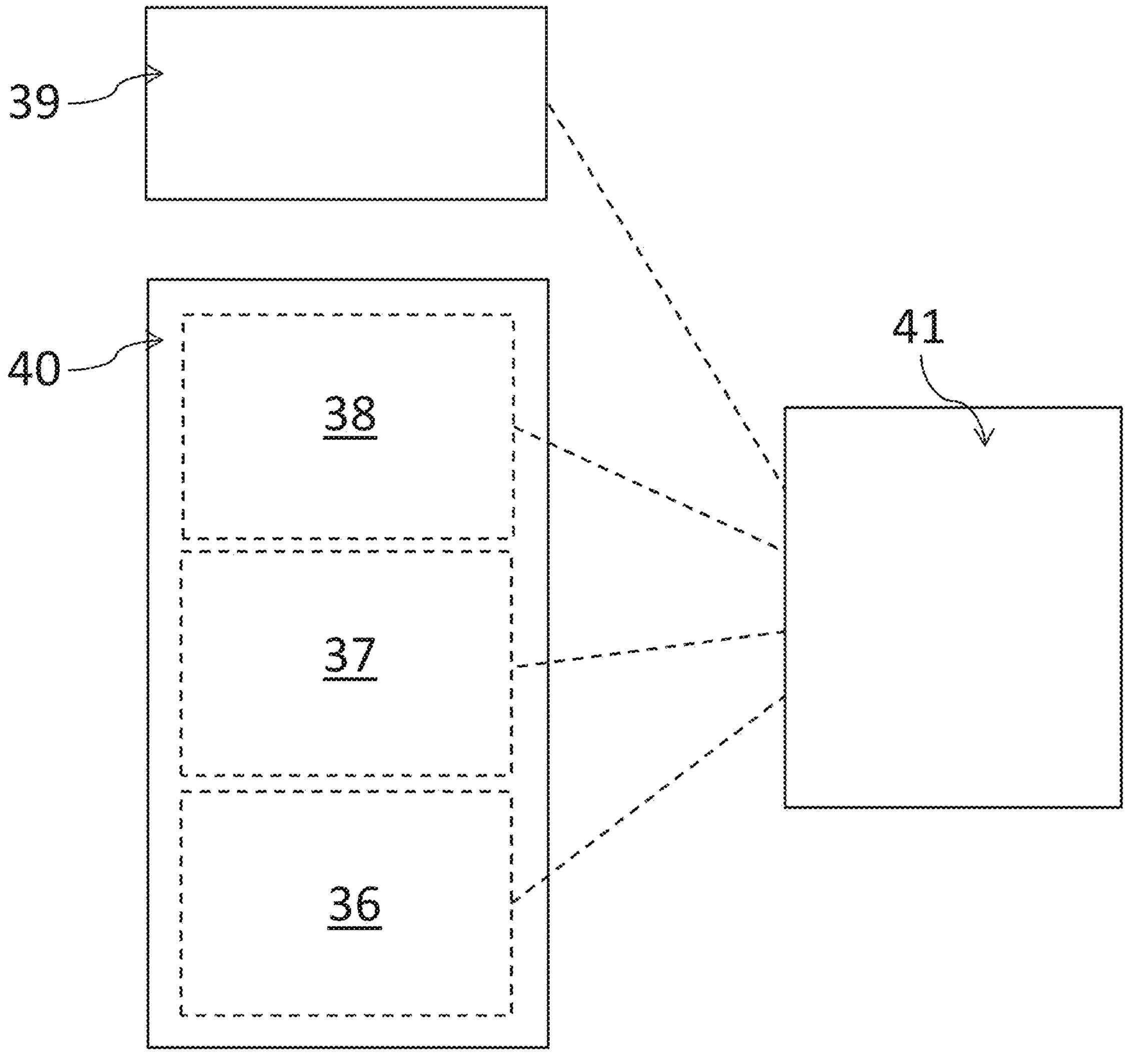
FIG. 11 shows an example of a control system in communication with a sample transport apparatus, in accordance with embodiments of the invention

FIG. 11 shows an example of a control system 41 in communication with a sample transport system 40, in accordance with embodiments of the invention. The sample transport may include or be providing sample to a mass analyzer 39, such as a mass spectrometer. The sample analysis system may include a sample transport apparatus and a mass analyzer. The sample analysis system may be an ICP-MS sample analysis system.

A control system may or may not be provided that may provide instructions to one or more parts of the sample analysis system. For instance, the control system may provide instructions that may control operation of a mass analyzer. The control system may provide instructions that may control operation of one or more components of the sample transport system, such as a droplet generator 36, conveyance module 37, and/or ICP torch 38.

For instance, the control system may provide instructions that may control sample input to a droplet generator, carrier input to a droplet generator, control of one or more valves or switches of a droplet generator, control of one or more pumps of a droplet generator, control of one or more temperature control elements of a droplet generator, or any other part of a droplet generator. The control system may aid in control of the generation of sample droplets and/or rate of flow within the droplet generator.

In another example, the control system may provide instructions that may control a switching mechanism of a conveyance module, and/or a syringe of the conveyance module. The control system may or may not provide instructions on the degree to depress the syringe.

Furthermore, the control system may provide instructions that may control operation of an ICP torch. The control system may provide instructions to control gas flow within an inner tube, middle tube, and/or outer tube. The instructions may be sent to one or more valves to control the rate at which the gas is flowing. Instructions may be provided to control operation of one or more load coil or any other component of the ICP torch.

Optionally, the control system may receive information from one or more component of the sample analysis system. For instance, one or more sensors may be provided at any part of the sample analysis system. Data from the one or more systems may be provided to the control system. Optionally, the data may be relied upon by one or more processors of the control system. The one or more processors may generate instructions based on the data received.

Although a single control system is provided by way of example, any description herein of a control system may apply to a control system of an individual component. For instance, one or more component may have its own individual control system that may operate independently of any other control system. For instance, a droplet generator, a conveyance module, an ICP torch, and/or mass analyzer may have its own control system.

The control system may be located anywhere relative to a sample analysis system. The control system may be located at or near the sample analysis system. The control system may be located at or near the sample transport apparatus or any component of the sample transport apparatus. The control system may have a single location or multiple locations. The control system may be located remotely from the sample analysis system. The control system may be located remotely from the sane transport apparatus or any component thereof. The control system may directly communicate via a hardwired communication channel, or via a wireless communication channel.

It should be noted that application of the provided methods and systems are not limited by the underlying computing infrastructure or computing environment. For instance, the provided control system may be applied to grid computing platform or systems utilizing various technologies such as mesh computing, peer-to-peer computing, autonomic (self-healing) computing, wireless sensor networks, mobile data acquisition, mobile signature analysis, cooperative distributed peer-to-peer ad hoc networking and processing, local cloud/fog computing and grid/mesh computing, dew computing, mobile edge computing, cloudlet, distributed data storage and retrieval, remote cloud services, augmented reality and the like. It is understood in advance that although this specification includes description of cloud computing, implementation of the teachings recited herein are not limited to a cloud computing environment. Rather, embodiments of the present invention are capable of being implemented in conjunction with any other types of computing environment now known or later developed.

Figure 12:
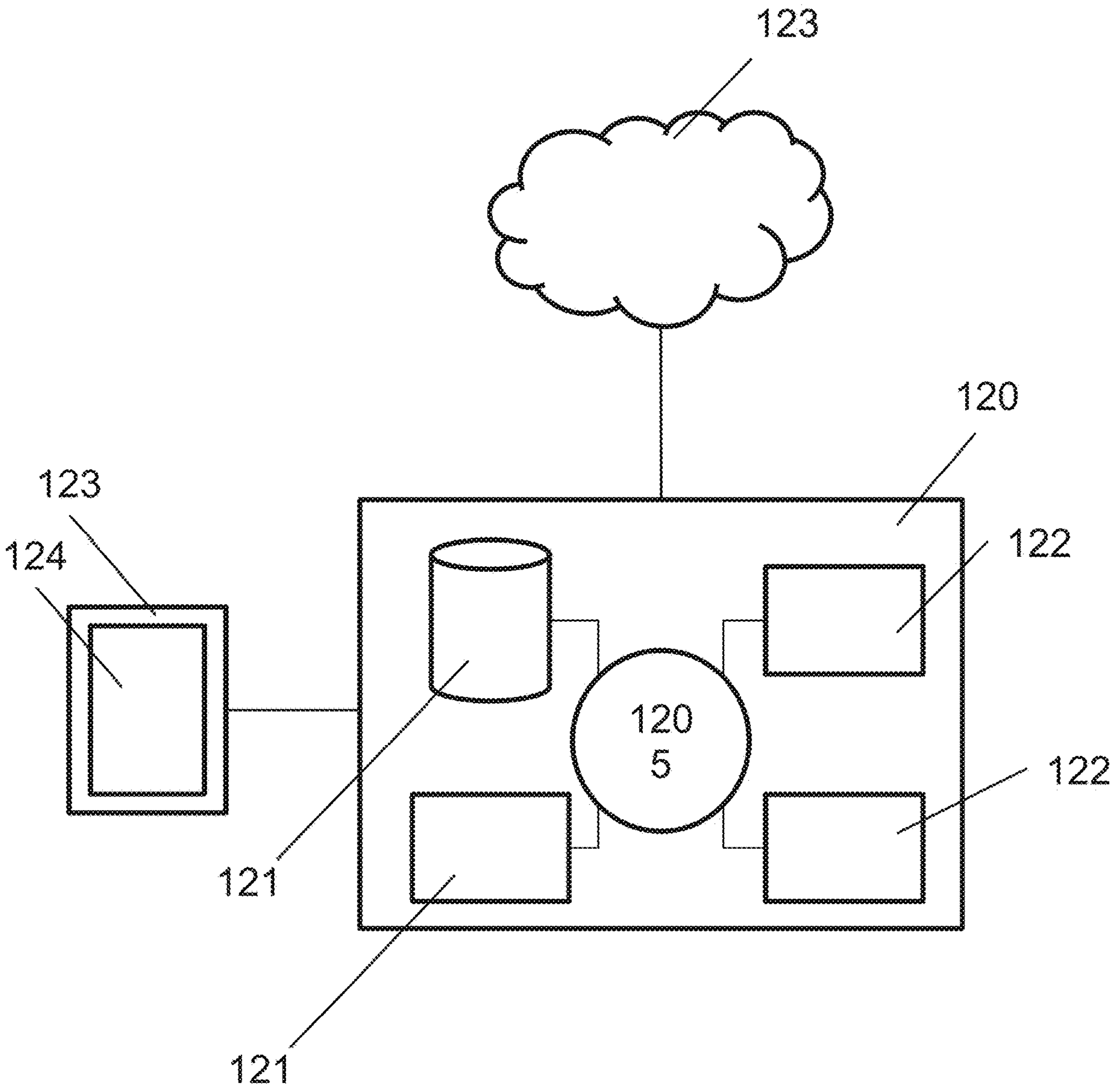
FIG. 12 shows an example of a computer system, provided in accordance with embodiments of the invention.

The present disclosure provides computer systems that are programmed to implement methods and systems of the disclosure. FIG. 12 shows a computer system 1201 that is programmed or otherwise configured to implement a control system for a sample analysis or sample transport system as described above. The computer system 1201 can regulate various aspects of the present disclosure, such as, for example, implementing various components of the control system, rendering graphical user interfaces and the other functions as described elsewhere herein. The computer system 1201 can be an electronic device of a user or a computer system that is remotely located with respect to the electronic device. The electronic device can optionally be a mobile electronic device.

The computer system 1201 includes a central processing unit (CPU, also "processor" and "computer processor" herein) 1205, which can be a single core or multi core processor, or a plurality of processors for parallel processing. The computer system 1201 also includes memory or memory location 1210 (e.g., random-access memory, read-only memory, flash memory), electronic storage unit 1215 (e.g., hard disk), communication interface 1220 (e.g., network adapter) for communicating with one or more other systems, and peripheral devices 1225, such as cache, other memory, data storage and/or electronic display adapters. The memory 1210, storage unit 1215, interface 1220 and peripheral devices 1225 are in communication with the CPU 1205 through a communication bus (solid lines), such as a motherboard. The storage unit 1215 can be a data storage unit (or data repository) for storing data. The computer system 1201 can be operatively coupled to a computer network ("network") 1230 with the aid of the communication interface 1220. The network 1230 can be the Internet, an internet and/or extranet, or an intranet and/or extranet that is in communication with the Internet.

The network 1230 in some cases is a telecommunication and/or data network. The network 1830 can include one or more computer servers, which can enable distributed computing, such as cloud computing. For example, one or more computer servers may enable cloud computing over the network 1230 ("the cloud") to perform various aspects of analysis, calculation, and generation of the present disclosure, such as, for example, capturing a configuration of one or more experimental environments; performing usage analyses of products (e.g., applications); and providing outputs of statistics of projects. Such cloud computing may be provided by cloud computing platforms such as, for example, Amazon Web Services (AWS), Microsoft Azure, Google Cloud Platform, and IBM cloud. The network 1230, in some cases with the aid of the computer system 1201, can implement a peer-to-peer network, which may enable devices coupled to the computer system 1201 to behave as a client or a server.

The CPU 1205 can execute a sequence of machine-readable instructions, which can be embodied in a program or software. The instructions may be stored in a memory location, such as the memory 1210. The instructions can be directed to the CPU 1205, which can subsequently program or otherwise configure the CPU 1205 to implement methods of the present disclosure. Examples of operations performed by the CPU 1205 can include fetch, decode, execute, and writeback.

The CPU 1205 can be part of a circuit, such as an integrated circuit. One or more other components of the system 1201 can be included in the circuit. In some cases, the circuit is an application specific integrated circuit (ASIC).

The storage unit 1215 can store files, such as drivers, libraries and saved programs. The storage unit 1215 can store user data, e.g., user preferences and user programs. The computer system 1201 in some cases can include one or more additional data storage units that are external to the computer system 1201, such as located on a remote server that is in communication with the computer system 1201 through an intranet or the Internet.

The computer system 1201 can communicate with one or more remote computer systems through the network 1230. For instance, the computer system 1201 can communicate with a remote computer system of a user (e.g., a user of an experimental environment). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1801 via the network 1230.

Methods as described herein can be implemented by way of machine (e.g., computer processor) executable code stored on an electronic storage location of the computer system 1201, such as, for example, on the memory 1210 or electronic storage unit 1215. The machine executable or machine readable code can be provided in the form of software. During use, the code can be executed by the processor 1205. In some cases, the code can be retrieved from the storage unit 1215 and stored on the memory 1210 for ready access by the processor 1205. In some situations, the electronic storage unit 1215 can be precluded, and machine-executable instructions are stored on memory 1210.

The code can be pre-compiled and configured for use with a machine having a processer adapted to execute the code, or can be compiled during runtime. The code can be supplied in a programming language that can be selected to enable the code to execute in a pre-compiled or as-compiled fashion.

Aspects of the systems and methods provided herein, such as the computer system 1201, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1201 can include or be in communication with an electronic display 1235 that comprises a user interface (UI) 1240 for providing, for example, the various components (e.g., lab, launch pad, control center, knowledge center, etc) of the model management system. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1205. The algorithm can, for example, generate instructions to operate one or more component of a sample transport system.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. Furthermore, it shall be understood that all aspects of the invention are not limited to the specific depictions, configurations or relative proportions set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A system for transporting individual particles for mass spectrometry, said system comprising:

a module configured to form individual sample droplets by merging distributed particle suspension with a carrier fluid to encase individual particles in the carrier fluid; and a torch that receives the individual sample droplets and generates a spray that is ionized and to be received by a downstream mass analyzer.

2. The system of claim 1, wherein the individual particles are individual cells, beads or aerosols.

3. The system of claim 1, wherein the carrier fluid is an oil.

4. The system of claim 1, wherein the module comprises a microfluidic chip.

5. The system of claim 1, wherein the individual particles suspensions are transferred along a sample fluid channel, and wherein the carrier fluid is transferred along one or more oil channels.

6. The system of claim 1, further comprising a conveyance module for receiving the individual sample droplets and conveying the individual sample droplets to the torch.

7. The system of claim 1, wherein the torch is an inductively couple plasma (ICP) torch.

8. The system of claim 1, wherein the system achieves a sample transport efficiency of at least 90%.

9. A method for transporting individual particles for mass spectrometry, said method comprising:

forming individual sample droplets by merging distributed particle suspension with a carrier fluid to encase individual particles in the carrier fluid;

receiving the individual sample droplets at a torch, and generating a spray that is ionized; and transporting ionized sample to a downstream mass analyzer.

10. A conveyance module for individual sample droplets, said module comprising:

an inlet path configured to receive the individual sample droplets, wherein an individual sample droplet comprises an individual sample particle encased in a carrier fluid droplet; and a vertical syringe configured to receive the individual sample droplets from the inlet path and inject the droplets to a torch that creates a spray for downstream analyzing of the individual sample particle for mass spectrometry.

11. The module of claim 10, further comprising a switching valve configured to selectively create (1) a fluid path between the inlet path and the vertical syringe, and (2) a fluid path between the vertical syringe and the torch.

12. The module of claim 11, wherein the switching valve operates between two positions to selectively create (1) the fluid path between the inlet path and the vertical syringe, and (2) the fluid path between the vertical syringe and the torch.

13. The module of claim 11, wherein the switching valve alternates between (1) the fluid path between the inlet path and the vertical syringe, and (2) the fluid path between the vertical syringe and the torch, without manually disconnecting fluid.

14. The module of claim 11, wherein the switching valve alternates between (1) the fluid path between the inlet path and the vertical syringe, and (2) the fluid path between the vertical syringe and the torch, by switching by a pair of a rotor and stator.

15. The module of claim 10, wherein the vertical syringe comprises a background oil that enables the individual sample droplets to float above the background oil.

16. The module of claim 15, wherein the vertical syringe injects the individual sample droplets out of the syringe after standing in the syringe for a period of time that allows the individual sample droplets to float above the background oil.

17. The module of claim 16, wherein the individual sample droplets are injected to an outlet path to the torch.

18. The module of claim 17, wherein the outlet path comprises capillary tubing.

19. The module of claim 10, wherein the individual sample droplets are formed using a microfluidic chip.

20. The module of claim 19, wherein the microfluidic chip comprises a sample fluid channel for transporting the individual sample particle, and one or more oil channels for transporting the carrier fluid.

* * * * *